US010705793B1

(12) United States Patent
Young

(10) Patent No.: US 10,705,793 B1
(45) Date of Patent: Jul. 7, 2020

(54) LOW LATENCY MODE FOR WIRELESS COMMUNICATION BETWEEN DEVICES

(71) Applicant: BOSE CORPORATION, Framingham, MA (US)

(72) Inventor: Douglas Warren Young, Arlington, MA (US)

(73) Assignee: BOSE CORPORATION, Framingham, MA (US)

( * ) Notice: Subject to any disclaimer, the term of this patent is extended or adjusted under 35 U.S.C. 154(b) by 0 days.

(21) Appl. No.: 16/430,809

(22) Filed: Jun. 4, 2019

(51) Int. Cl.
| | |
|---|---|
| *G06F 3/16* | (2006.01) |
| *H04W 4/80* | (2018.01) |
| *H04R 3/00* | (2006.01) |
| *G10L 15/22* | (2006.01) |
| *H04S 7/00* | (2006.01) |

(52) U.S. Cl.
CPC ............. *G06F 3/165* (2013.01); *G06F 3/162* (2013.01); *G10L 15/22* (2013.01); *H04R 3/00* (2013.01); *H04S 7/30* (2013.01); *H04W 4/80* (2018.02); *G10L 2015/223* (2013.01); *H04R 2420/07* (2013.01)

(58) Field of Classification Search
CPC ..... G06F 3/165; G06F 3/162; H04R 2420/07; H04R 5/033; G10L 19/008; G10L 19/167

USPC .................. 381/22, 23, 74; 700/94
See application file for complete search history.

(56) References Cited

U.S. PATENT DOCUMENTS

| | | | |
|---|---|---|---|
| 2017/0221072 A1* | 8/2017 | AthuluruTlrumala | ...................... H04W 4/029 |
| 2019/0173934 A1* | 6/2019 | Beattie, Jr. ............ | H04L 65/607 |
| 2019/0349662 A1* | 11/2019 | Lindahl ................ | H04R 1/1041 |
| 2020/0004496 A1* | 1/2020 | Park ....................... | H04W 76/10 |

* cited by examiner

*Primary Examiner* — Alexander Krzystan
(74) *Attorney, Agent, or Firm* — Patterson + Sheridan, LLP

(57) ABSTRACT

A method is provided for exchanging data between a user device and an audio output device over a wireless link. A user device detects that a trigger event for initializing a low latency mode has occurred at the user device, the low latency mode configured to cause the audio output device to reduce a size of a render buffer to be used for rendering audio data. In response to the detecting, the user device transmits an indication to the audio output device to initialize the low latency mode, the indication causing the audio output device to reduce the size of the render buffer to be used for rendering the audio data. The user device then transmits the audio data to the audio output device over the wireless link.

24 Claims, 3 Drawing Sheets

LOW LATENCY MODE FOR WIRELESS COMMUNICATION BETWEEN DEVICES

FIELD

Aspects of the disclosure generally relate to wireless communication, and more specifically to a low latency mode for wireless communication between devices.

BACKGROUND

Bluetooth is a wireless communication technology standard for exchanging data between fixed and mobile devices over short distances. In order to use the Bluetooth protocol, a device must be compatible with the subset of Bluetooth profiles (often called services) necessary to use the desired services. A Bluetooth profile is a specification regarding an aspect of Bluetooth-based wireless communication between devices. Two widely used Bluetooth profiles for communication of audio between a Bluetooth source (e.g., smartphone) and a Bluetooth accessory device (e.g., Bluetooth audio headphones) include the Hands Free Profile (HFP) and the Advanced Audio Distribution Profile (A2DP).

The HFP is designed to exchange low latency and relatively lower quality, bi-directional voice audio (e.g., voice data related to phone calls) and has a latency of about 40 milliseconds (ms) but limits the sampling rate either to 8 kiloHertz (kHz) (narrowband, i.e. 4 kHz of audio bandwidth) or 16 kHz (wideband, i.e. 8 kHz of audio bandwidth). Wideband speech HFP packets are encoded using the low-complexity subband codec (mSBC), at a fixed rate of 64 kilobits per second (kbps).

A2DP defines a way to send full bandwidth audio (e.g., higher quality audio such as music) in a single direction, such as from a smart phone to Bluetooth headphones. Most Bluetooth source devices choose a sampling frequency of 44.1 kHz or 48 kHz for A2DP communication. SBC is the mandatory codec used for transmitting A2DP audio and typically sends high quality audio data at around 350 kbps. Optional codecs like Advanced Audio Coding (AAC) usually send audio data at around 250 kbps. A2DP audio is sent over the Logical Link Control and Adaptation Protocol (L2CAP), which schedules packets asynchronously. This gives a source device more flexibility to interleave the higher bandwidth audio data with other radio frequency (RF) (e.g., Bluetooth & WiFi) traffic. However, more jitter is generally involved in the delivery of L2CAP packets and the source device does not guarantee when those packets will be delivered to the target device. Thus, more audio has to be buffered up by the target device before being played to avoid audio dropouts, which, as a result, increases the latency of the audio received at the target device.

Accordingly, methods for communicating high quality audio data over a Bluetooth link at lower link latencies, as well as apparatuses and systems configured to implement these methods are desired.

SUMMARY

All examples and features mentioned herein can be combined in any technically possible manner.

Aspects of the present disclosure provide a method for exchanging data between a user device and an audio output device over a wireless link. The method generally includes detecting that a trigger event for initializing a low latency mode has occurred at the user device, the low latency mode configured to cause the audio output device to reduce a size of a render buffer to be used for rendering audio data; transmitting, in response to the detecting, an indication to the audio output device to initialize the low latency mode, the indication causing the audio output device to reduce the size of the buffer to be used for rendering the audio data; and transmitting the audio data to the audio output device over the wireless link.

In an aspect, the render buffer is reduced by at least half compared to an initial render buffer size.

In an aspect, detecting the trigger event includes detecting that a software application that utilizes the low latency mode has been launched on the user device.

In an aspect, the method further includes providing an Application Programming Interface (API) to the software application by using a Software Development Kit (SDK) embedded in the software application, the SDK providing the software application, via the API, access to at least one capability of the audio output device.

In an aspect, the SDK performs at least the detecting the trigger event and the transmitting the indication.

In an aspect, detecting the trigger event includes detecting that a power of signals received from the audio output device has exceeded a signal power threshold.

In an aspect, detecting the trigger event includes a determination that the audio data includes spatial audio to be rendered at the audio output device.

In an aspect, detecting the trigger event includes receiving a voice command via a Virtual Personal Assistant (VPA) to enter the low latency mode.

In an aspect, the wireless link uses a Bluetooth protocol.

In an aspect, the Bluetooth protocol uses the Advanced Audio Distribution Profile (A2DP) to transmit the audio data to the audio output device.

In an aspect, the audio data is encoded using one or more codecs that are not natively supported by the user device to achieve a lower bitrate than what is natively supported by the user device.

In an aspect, the audio data has a sampling rate of at least 44.1 kilohertz and/or a linear bit depth of at least 16 bits per sample.

In an aspect, the method further includes receiving data from the audio output device over the wireless link while simultaneously transmitting the audio data to the audio output device.

In an aspect, the data received from the audio output device is voice data collected from at least one microphone of the audio output device.

In an aspect, the data received from the audio output device is sensor data collected from at least one inertial measurement unit (IMU) of the audio output device.

Aspects of the present disclosure provide a computer-readable medium for exchanging data between a user device and an audio output device over a wireless link, the computer-readable medium storing instructions which when processed by at least one processor performs a method. The method generally includes detecting that a trigger event for initializing a low latency mode has occurred at the user device, the low latency mode configured to cause the audio output device to reduce a size of a render buffer to be used for rendering audio data; transmitting, in response to the detecting, an indication to the audio output device to initialize the low latency mode, the indication causing the audio output device to reduce the size of the render buffer to be used for rendering the audio data; and transmitting the audio data to the audio output device over the wireless link.

In an aspect, the render buffer is reduced by at least half compared to an initial render buffer size.

In an aspect, detecting the trigger event includes detecting that a software application that utilizes the low latency mode has been launched on the user device.

In an aspect, the computer-readable medium further includes instructions for providing an Application Programming Interface (API) to the software application by using a Software Development Kit (SDK) embedded in the software application, the SDK providing the software application, via the API, access to at least one capability of the audio output device.

In an aspect, the SDK performs at least the detecting the trigger event and the transmitting the indication.

In an aspect, detecting the trigger event includes detecting that a power of signals received from the audio output device has exceeded a signal power threshold.

In an aspect, detecting the trigger event includes a determination that the audio data includes spatial audio to be rendered at the audio output device.

In an aspect, detecting the trigger event includes receiving a voice command via a Virtual Personal Assistant (VPA) to enter the low latency mode.

In an aspect, the wireless link uses a Bluetooth protocol.

In an aspect, the Bluetooth protocol uses the Advanced Audio Distribution Profile (A2DP) to transmit the audio data to the audio output device.

In an aspect, the audio data is encoded using one or more codecs that are not natively supported by the user device to achieve a lower bitrate than what is natively supported by the user device.

In an aspect, the audio data has a sampling rate of at least 44.1 kilohertz and/or a linear bit depth of at least 16 bits per sample.

In an aspect, the computer-readable medium further includes instructions for receiving data from the audio output device over the wireless link while simultaneously transmitting the audio data to the audio output device.

In an aspect, the data received from the audio output device is voice data collected from at least one microphone of the audio output device.

In an aspect, the data received from the audio output device is sensor data collected from at least one inertial measurement unit (IMU) of the audio output device.

Two or more features described in this disclosure, including those described in this summary section, may be combined to form implementations not specifically described herein.

The details of one or more implementations are set forth in the accompanying drawings and the description below. Other features, objects and advantages will be apparent from the description and drawings, and from the claims.

DETAILED DESCRIPTION

Figure 1:
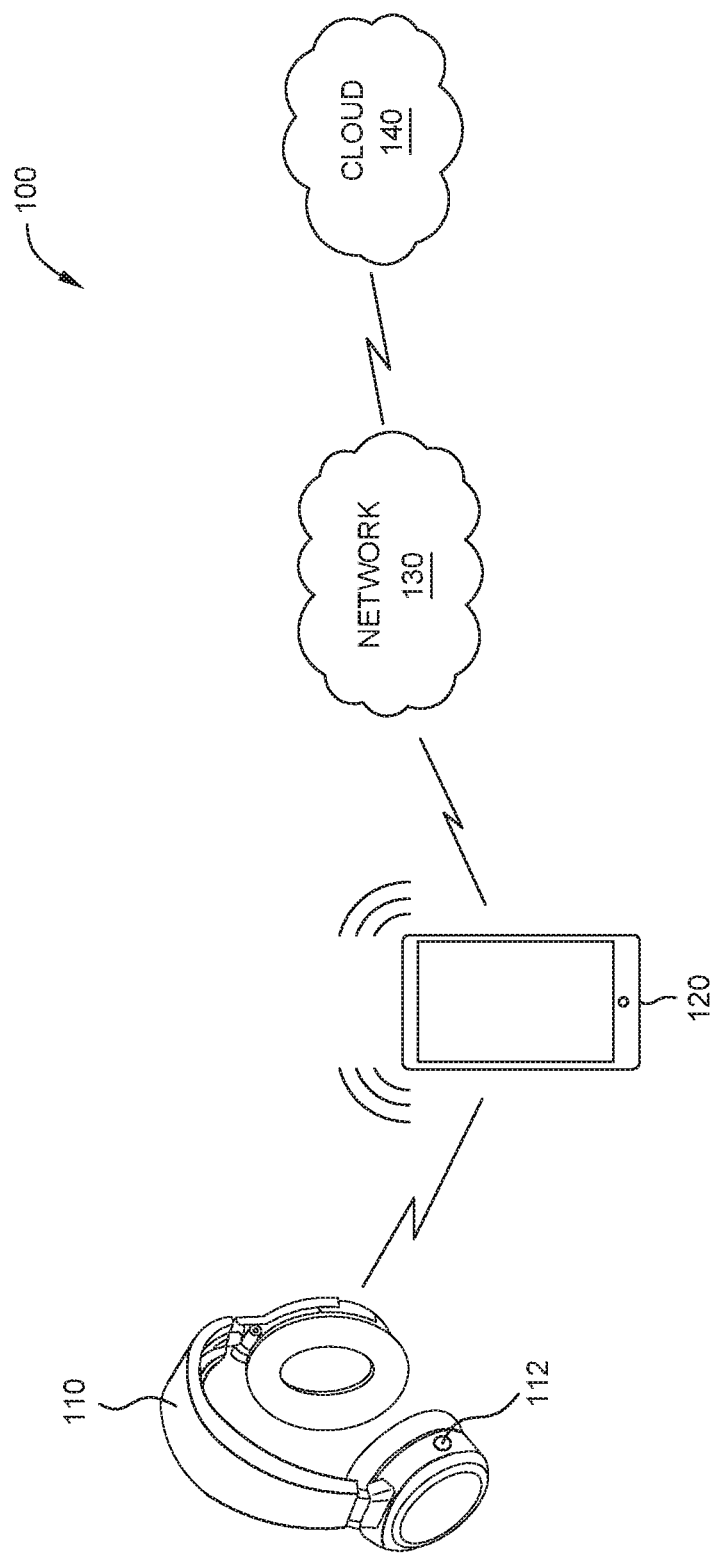
FIG. 1 illustrates an example system in which aspects of the present disclosure may be implemented.

Bluetooth operates in a crowded spectrum and thus packet dropouts are a common occurrence. To ensure that the user does not experience audio dropouts, incoming audio packets are buffered at a target audio output device to provide enough time for retransmission of any missed/dropped packets before the audio is rendered and played to the user. Thus, when Bluetooth audio is sent from a source device, such as a smartphone, to a target audio output device, such as Bluetooth headphones, it is typically buffered up in an incoming audio buffer at the target device before the audio is actually rendered and output as audio, which is referred to herein as the audio render buffer or render buffer. This is done to ensure that even if there are RF collisions that cause audio packets to be lost during transmission, that there is time for the lost audio packets to be retransmitted by the Bluetooth source device before they have to be rendered by the target device. This helps to ensure that the user does not experience audio dropouts due to Bluetooth packet collisions even under challenging RF conditions.

In practice, the render buffer is a large portion of the end-to-end latency of the Bluetooth audio link. Most Bluetooth audio output devices on the market have a latency of around 150 ms for high quality A2DP audio, even though it takes 10 ms or less to transmit an individual audio frame over the air. The render buffer can be reduced in order to reduce the Bluetooth latency, but doing so may cause audio dropouts under challenging RF conditions.

The buffering of incoming audio packets at audio output devices generally is not a problem for most applications, as most audio content being streamed via a Bluetooth link includes a predetermined stream of audio data. Examples of such predetermined audio streams include music audio, audio related to video, and so forth. Such audio streams that are known ahead of time can be initially delayed by buffering at the receiver to account for retransmission times, after which the stream can be output to the user at a constant rate so that the user does not perceive any delay. In cases where an audio stream is associated with a video (e.g., user watching a movie on a smartphone and streaming associated audio to Bluetooth headphones), the system knows ahead of time the video and associated audio content that is to be played. In such cases, the video stream can be delayed to compensate for any latency associated with streaming audio over the Bluetooth link, so that the user does not perceive an audio lag.

However, certain applications generate audio and/or video that changes dynamically and is not known ahead of time. For example, gaming applications generate video and associated audio that can be dynamic and is not expected and/or known ahead of time. For instance, the video/audio generated by a gaming application is generally based on interactions of the user with the gaming application, such as actions by the user while playing a game. Thus, when using Bluetooth headphones with a gaming application, since the gaming audio and associated video can be dynamic (e.g., not expected and/or not known ahead of time), the video cannot be delayed to compensate for audio streaming latency, and thus the user perceives a delay in the audio. Thus, Bluetooth devices are generally not ideal for gaming applications.

As another example, audio augmented reality (AR) applications generate audio (e.g., spatial audio) dynamically as a function of the user's location, an environment of the user, the user's head orientation, and/or other variables to provide an immersive audio experience to the user. When using Bluetooth headphones with an audio AR application, audio AR data based on the user's head orientation (e.g., determined based on inertial measurement unit (IMU) sensors on the headphones) may need to be streamed to the headphones as fast as possible so that the user can perceive audio shifts in real time as the user's head moves. In an aspect, when using a gaming application with audio AR capability, a user playing a game can be provided with an immersive gaming experience by shifting the audio soundscape with the turning user's head.

Typical latency of a Bluetooth link between a source device and a target audio output device is too high to be usable for applications that require low latency communication of high quality audio data, as is the case for various applications, such as gaming applications and audio AR applications. There are certain proprietary Bluetooth codecs on the market (e.g., aptX Low Latency codec, aptX-LL codec) that set up certain parameters at the Bluetooth source and target devices to offer a low latency audio link. However, these codecs are not widely adopted in the industry and many Bluetooth devices do not support these codecs. Popular Bluetooth profiles like HFP offer relatively low latency audio (~40 ms instead of ~150 ms for A2DP), but do not offer full music quality audio (e.g., greater than 44.1 kHz sample rate and/or higher than 16-bit linear bit depth) over the Bluetooth link, as is typically desired by gaming applications and audio AR applications.

Certain aspects of the present disclosure provide techniques for low latency communication of high quality audio data over a Bluetooth wireless link between a Bluetooth source device and a Bluetooth target device.

FIG. 1 illustrates an example system 100 in which aspects of the present disclosure can be practiced.

As shown, system 100 includes a pair of headphones 110 communicatively coupled with a portable user device 120. In an aspect, the headphones 110 include one or more microphones 112 to detect sound in the vicinity of the headphones 110. The headphones 110 also include at least one acoustic transducer (also known as driver or speaker) for outputting sound. The included acoustic transducer(s) can be configured to transmit audio through air and/or through bone (e.g., via bone conduction, such as through the bones of the skull). The headphones 110 can further include hardware and circuitry including processor(s)/processing system and memory configured to implement one or more sound management capabilities or other capabilities including, but not limited to, noise cancelling circuitry (not shown) and/or noise masking circuitry (not shown), body movement detecting devices/sensors and circuitry (e.g., one or more accelerometers, one or more gyroscopes, one or more magnetometers, etc.), geolocation circuitry and other sound processing circuitry. The noise cancelling circuitry is configured to reduce unwanted ambient sounds external to the headphones 110 by using active noise cancelling. The noise masking circuitry is configured to reduce distractions by playing masking sounds via the speakers of the headphones 110. The movement detecting circuitry is configured to use devices/sensors such as an accelerometer, gyroscope, magnetometer, or the like to detect whether the user wearing the headphones is moving (e.g., walking, running, in a moving mode of transport etc.) or is at rest and/or the direction the user is looking or facing. The movement detecting circuitry can also be configured to detect a head position of the user for use in AR applications where an AR sound is played back based on a direction of gaze of the user. The geolocation circuitry can be configured to detect a physical location of the user wearing the headphones. For example, the geolocation circuitry includes Global Positioning System (GPS) antenna and related circuitry to determine GPS coordinates of the user.

In an aspect, the headphones 110 include voice activity detection (VAD) circuitry capable of detecting the presence of speech signals (e.g. human speech signals) in a sound signal received by the microphones 112 of the headphones 110. For instance, the microphones 112 of the headphones 110 can receive ambient external sounds in the vicinity of the headphones 110, including speech uttered by the user. The sound signal received by the microphones 112 may have the speech signal mixed in with other sounds in the vicinity of the headphones 110. Using the VAD, the headphones 110 can detect and extract the speech signal from the received sound signal. In an aspect, the VAD circuitry can be used to detect and extract speech uttered by the user in order to facilitate a voice call, voice chat between the user and another person, or voice commands for a virtual personal assistant (VPA), such as a cloud based VPA.

In an aspect, the headphones 110 are wirelessly connected to the portable user device 120 using one or more wireless communication methods including, but not limited to, Bluetooth, Wi-Fi, Bluetooth Low Energy (BLE), other RF-based techniques, or the like. In an aspect, the headphones 110 include a transceiver that transmits and receives data via one or more antennae in order to exchange audio data and other information with the user device 120.

In an aspect, the headphones 110 include communication circuitry capable of transmitting and receiving audio data and other information from the portable user device 120. The headphones 110 also include an incoming audio buffer, such as a render buffer, that buffers at least a portion of an incoming audio signal (e.g., audio packets) in order to allow time for retransmissions of any missed or dropped data packets from the user device 120. For example, when receiving Bluetooth transmissions from the portable user device 120, the communication circuitry typically buffers at least a portion of the incoming audio data in the render buffer before the audio is actually rendered and output as audio to at least one of the transducers (e.g., audio speakers) of the user device 120. This is done to ensure that even if there are RF collisions that cause audio packets to be lost during transmission, that there is time for the lost audio packets to be retransmitted by the user device 120 before they have to be rendered by the headphones 110 for output by one or more acoustic transducers (e.g., audio speakers) of the headphones 110.

In an aspect, the headphones 110 can be connected to the portable user device 120 using a wired connection, with or without a corresponding wireless connection. As shown, the user device 120 can be connected to a network 130 (e.g., the Internet) and can access one or more services over the network. As shown, these services can include one or more cloud services 140.

The portable user device 120 is representative of a variety of computing devices, such as mobile telephone (e.g., smart phone) or a computing tablet. In an aspect, the user device 120 can access a cloud server in the cloud 140 over the network 130 using a mobile web browser or a local software application or "app" executed on the user device 120. In an aspect, the software application or "app" is a local application that is installed and runs locally on the user device 120. In an aspect, a cloud server accessible on the cloud 140 includes one or more cloud applications that are run on the cloud server. The cloud application can be accessed and run by the user device 120. For example, the cloud application can generate web pages that are rendered by the mobile web browser on the user device 120. In an aspect, a mobile software application installed on the user device 120 or a cloud application installed on a cloud server, individually or in combination, may be used to implement the techniques for low latency Bluetooth communication between the user device 120 and the headphones 110 in accordance with aspects of the present disclosure. In an aspect, examples of the local software application and the cloud application include a gaming application, an audio AR application, and/or a gaming application with audio AR capabilities.

It can be noted that although certain aspects of the present disclosure may discuss low latency Bluetooth communication between a smartphone and headphones for exemplary purposes, any portable user device and any wireless audio output device with similar capabilities can be interchangeably used in these aspects. For instance, a wearable wireless audio output device usable with techniques discussed herein can include over-the-ear headphones, audio eyeglasses or frames, in-ear buds, around-ear audio devices, neck-worn audio devices, or the like. Further, in some aspects, the wireless audio output device need not be wearable, and can more generally be a wireless audio output device including at least one electro-acoustic transducer and at least one wireless module capable of implementing the techniques described herein. For instance, in some such aspects, the wireless audio output device is a speaker or a speaker system. However, as can be understood based on this disclosure, wearable audio devices are used for some implementations, such as those that employ an audio AR application as a trigger for initiating the low latency mode. For ease of description, the wireless audio output device is depicted in the figures and described herein as headphones 110. Similarly, a portable user device usable with techniques discussed herein can include a smart phone, a tablet device, a portable gaming console, a laptop computer, a smart watch, or, generally, any portable or mobile computing device. In any such case, for ease of description, the portable user device is depicted in the figures and described herein as user device 120.

As noted in the above paragraphs, the incoming audio render buffer of a target device receiving a Bluetooth audio stream dominates the end-to-end latency of the Bluetooth audio link. In certain aspects, the overall latency of audio output at the target device can be lowered by reducing the size of the render buffer at the receiving device resulting in less data being buffered before it is rendered and played to the user. However, doing this all the time can result in unacceptably poor RF robustness and lead to excessive audio dropouts in many use cases, especially under challenging RF conditions. For example, where a user is listening to music on headphones 110 via a Bluetooth audio stream while user device 120 is in the user's pants pocket, the Bluetooth audio stream may have to travel through the user's body, thereby dictating a relatively large render buffer (e.g., 150 ms or greater) at headphones 110 to increase audio output robustness and reduce audio dropouts. However, with the relatively large render buffer size comes increased audio output latency due to the related delay in playback until the buffer is full.

In certain aspects, a size of the render buffer of a target device can be selectively reduced in order to lower the latency related to audio output at the target device, based on a context of the use case in which the audio streaming is being used. For example, a reduced size of the Bluetooth render buffer can be selected in response to detecting certain trigger events relating to use cases utilizing low latency communication of audio data. Thus, in some aspects, the techniques described herein include enabling a low latency mode when it is desired (e.g., in response to a trigger), and disabling the low latency mode at all other times (e.g., in response to removal of the initial trigger or in response to an additional trigger).

Figure 2:
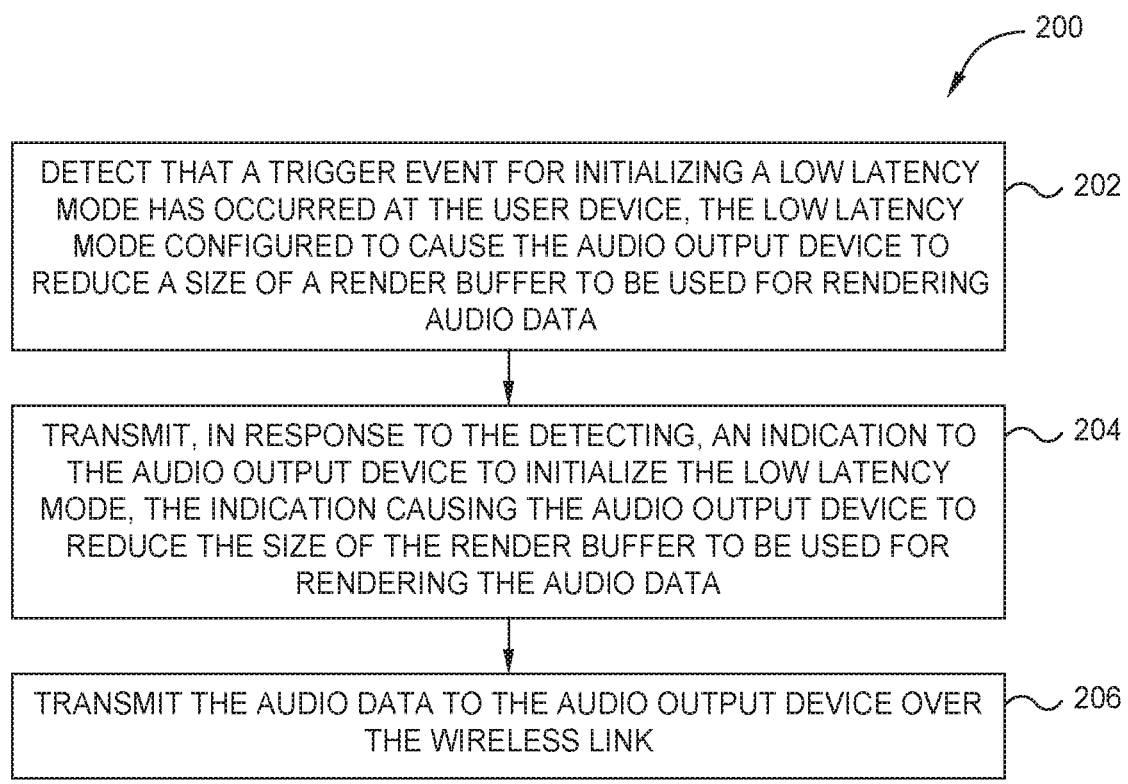
FIG. 2 illustrates example operations that can be performed by a user device for exchanging data between a user device and an audio output device over a wireless link, in accordance with certain aspects of the present disclosure.

FIG. 2 illustrates example operations 200 that can be performed by a user device (e.g., portable user device 110) for exchanging data (e.g., high quality audio data with a sampling rate or at least 44.1 KHz and/or a linear depth of at least 16 bits per sample) between a user device and an audio output device (e.g., headphones 110) over a wireless link (e.g., Bluetooth link), in accordance with certain aspects of the present disclosure. For example, operations 200 can be performed by a smartphone for exchanging audio data with headphones worn by a user.

Operations 200 begin, at 202, by detecting that a trigger event for initializing a low latency mode has occurred at the user device, the low latency mode configured to cause the audio output device to reduce a size of a render buffer to be used for rendering audio data.

At 204, in response to detecting the trigger event, the user device transmits an indication to the audio output device to initialize the low latency mode, the indication causing the audio output device to reduce the size of the render buffer to be used for rendering the audio data in the low latency mode.

At 206, audio data is transmitted by the user device to the audio output device over the wireless link.

Figure 3:
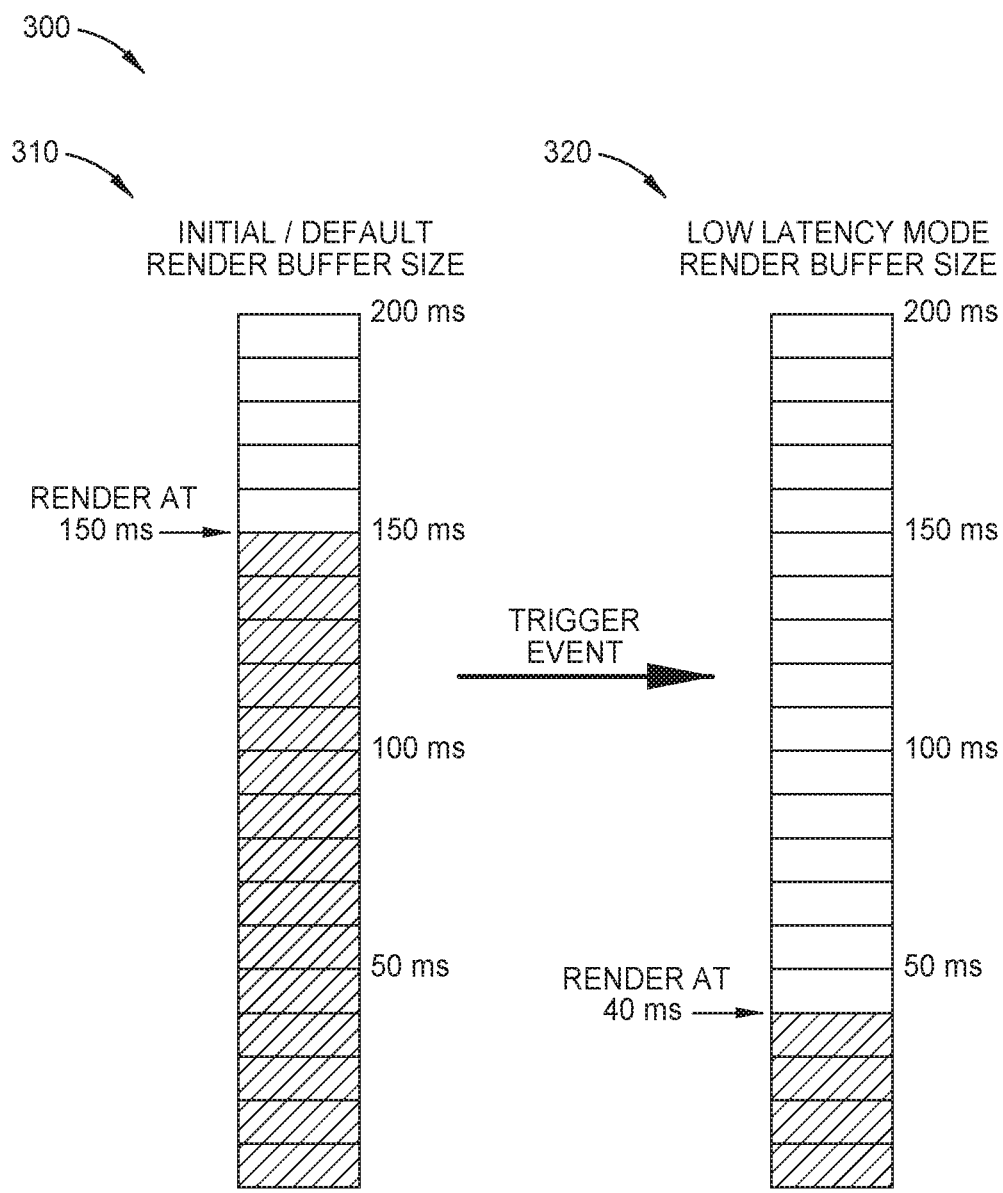
FIG. 3 illustrates an example comparison 300 between a default render buffer size and a buffer size that can be used in the low latency mode, in accordance with certain aspects of the present disclosure.

FIG. 3 illustrates an example comparison 300 between a default render buffer size and a buffer size that can be used in the low latency mode, in accordance with certain aspects of the present disclosure.

As shown in FIG. 3, 310 represents an initial or default render buffer size used at the audio output device, and 320 represents a render buffer size used at the audio output device when the low latency mode is active. In an aspect, the audio output device renders audio data at an initial or default latency by using an initial or default render buffer size, when the low latency mode is not active. As shown in the example comparison the audio data is rendered by the audio output device at an initial or default latency of 150 ms. In an aspect, the audio output device renders the audio data at a reduced latency by using a reduced render buffer size, when the low latency mode is active. As shown in the example comparison the audio data is rendered by the audio output device at a reduced latency of 40 ms. As described in the above paragraphs, the low latency mode can be initialized by the user device upon detecting a trigger event and a command can be sent to the audio output device to initialize the low latency mode. Note that the overall receive buffer at the audio output device is shown as 200 ms in FIG. 3 for ease of illustration, but the overall receive buffer size could be any value, such as 250 ms, 300 ms, 400 ms, 500 ms, 1 second (s), 1.5 s, 2 s, and so forth, depending on the particular configuration.

In certain aspects, the values of the initial/default render buffer size and the low latency mode render buffer size shown in FIG. 3 are for exemplary purpose, and each of the initial/default render buffer size and the low latency mode render buffer size can take one of a range of values. For instance, the initial/default render buffer size can take a value of 100, 110, 120, 130, 140, 150, 160, 170, 180, 190, or 200 ms. In an aspect, the low latency render buffer size can take values of at most 100, 90, 80, 70, 60, 50, 40, 30, or 20 ms. In an aspect, the low latency mode could cause a render buffer size reduction of at least 30, 40, 50, 60, 70, or 80% relative to the initial/default render buffer size. In an aspect, the low latency mode render buffer size can be reduced by at least 30, 40, 50, 60, 70, 80, 90, 100, 110, or 120 ms relative to an initial/default render buffer size.

In an aspect, the trigger event for initializing the low latency mode can include detecting that a software application that utilizes a low latency Bluetooth link has been launched (e.g., by the user) on the user device. In an aspect, the software application can be a local application installed and configured to run on the user device or can be a cloud application running in the cloud (e.g., cloud 140) and accessible over a network (e.g., network 130) using a web browser installed and configured to run on the user device. For example, the software application can be a gaming application, an audio AR application or a combination thereof (e.g., a gaming application with audio AR features) or any other application that can benefit from a low latency Bluetooth link. In an aspect, cloud 140 is directly accessibly by the audio output device (e.g., headphones 110), such that user device 120 need not be utilized to initialize the low latency mode. In such an aspect, cloud 140 can be directly accessed via any suitable wireless protocol or network, such as using Bluetooth, Wi-Fi, or cellular (e.g., 3G, 4G, 5G, LTE) technologies.

In an aspect, upon detecting that a software application that utilizes a low latency Bluetooth link or that may benefit from a low latency Bluetooth link has been launched, the user device can transmit a command to the audio output device to initialize the low latency mode. In response to receiving the command, the audio output device can initialize the low latency mode and reduce a size of the render buffer in order to lower the latency of audio output by the audio output device. In an aspect, the low latency mode is particularly useful for low latency end to end communication of high quality audio data (e.g., audio data with a sampling rate or at least 44.1 KHz and/or a linear depth of at least 16 bits per sample) from the user device to the audio output device. For example, the high quality audio data can include gaming audio, audio AR audio, spatialized audio, or a combination thereof.

In an example implementation, a Software Development Kit (SDK) can be embedded into a software application that utilizes low latency Bluetooth communication, and an Application Programming Interface (API) can be exposed which allows the software application to set the audio output device into the low latency mode. In an aspect, the SDK, via the API, provides the software application access to at least one capability of the audio output device including the capability of the audio output device to initialize the low latency mode. In an aspect, the SDK detects that the software application is launched and sends the command over the Bluetooth link to the audio output device to cause the audio output device to reduce the size of its render buffer in order to lower the overall latency related to the audio output.

In certain aspects, the lowering of the overall latency of audio output at the audio output device by reducing the render buffer size at the audio output device can be based on an assumed level of RF robustness required for the Bluetooth link between the user device and the audio output device. Generally, reducing the size of the render buffer reduces the RF robustness of the Bluetooth link. However, RF robustness may not be a problem or may be a less of a problem in certain scenarios. For example, when a user wearing audio headphones is playing a game on the user's smartphone and is streaming the gaming audio to the headphones over the Bluetooth link, the user is generally holding the smartphone in front of and closer to the user's face to enable the user to look at the screen of the smartphone while playing the game. In this case, since the smartphone is closer to the headphones, the signal strengths of transmissions over the Bluetooth link are relatively higher and the Bluetooth link does not require the same level of RF robustness as it does for example when the phone is in the user's pocket. Thus, in an aspect, the render buffer size can be lowered when the user is holding the user device near the audio output device which indicates that that Bluetooth link requires a lower level of RF robustness.

In certain aspects, another trigger event for initializing the low latency mode can include the user device and/or the audio output device detecting that the signal quality of transmissions between the user device and the audio output device is above a signal quality threshold. In an aspect, the signal quality can be represented by a strength of a Bluetooth signal received at the user device (in case the user device is the detection entity) or a strength of a Bluetooth signal received at the audio output device (in case the audio output device is the detection entity). In an aspect, the signal strength above a threshold level indicates that the user device is closer to the user's face and thus, closer to the headphones worn by the user. In an aspect, the signal threshold trigger event can be used in combination with the application launch trigger event, in order to determine whether the low latency Bluetooth mode is to be initialized. For example, when the user device detects that a software application that utilizes the low latency Bluetooth link is launched, the user device transmits the command to initialize the low latency mode only if the received signal strength of Bluetooth signals from the audio output device is above the threshold signal strength. Additionally or alternatively, when the audio output device receives a command from the user device to initialize the low latency mode, it does so only if the received signal strength of Bluetooth signals received from the user device is above the threshold signal strength. This ensures that the low latency mode is initialized only if RF robustness is not compromised beyond a certain acceptable level.

In certain aspects, proximity between the audio output device and the user device can be detected using other techniques, such as using one or more cameras, one or more ambient light sensors, and/or one or more orientation sensors (e.g., to detect that the phone is being held), to provide some additional examples. Any such techniques can be used to determine either that the low latency mode is to be initialized (e.g., as an initialization trigger mechanism) or that the low latency mode is past a confidence threshold to be initialized (e.g., as a confirmation mechanism). For instance, the front-facing camera of a user device (e.g., a smartphone) could be used to detect the user's face using any suitable face recognition technologies, and therefore determine whether to initialize the low latency mode or to confirm that it is suitable to initiate the low latency mode.

In certain aspects, when signal quality threshold of signals over the Bluetooth link is used for triggering the low latency mode there may be a need to differentiate between use cases that do not benefit from the low latency mode from other use cases that can benefit from the low latency mode. For example, the user can bring his/her smartphone or tablet device closer to the user's face in order to watch a video. This use case may not benefit from reducing the render buffer size as the user device/audio output device can implement other mechanisms to avoid a perceived latency in audio output as discussed in the above paragraphs. Thus, this use case needs to be differentiated from other use cases, such as the case when the user is playing a game, which as discussed above, can benefit from reducing the render buffer size. In an aspect, the user device transmits the command to initialize the low latency mode only when an audio stream (e.g., A2DP audio stream) related to a video application or music application is stopped or paused, in addition to detecting the quality of Bluetooth signals received at the audio output device and/or the user device exceeds the signal quality threshold. This ensures that the user is not listening to audio that would not benefit from low latency Bluetooth communication.

In certain aspects, another trigger event for initializing the low latency mode can include the user device and/or the audio output device detecting a voice command from the user using a Virtual Personal Assistant (VPA) application to initialize the low latency mode. In an aspect, the VPA application can be installed on the user device and the user can provide voice commands to the VPA directly using one or more microphones configured in the user device or by using one or more microphones configured in the audio output device, wherein voice commands detected by the one or more microphones configured in the audio output device can be streamed back to the user device over the Bluetooth link for interpretation by the VPA application. In an aspect, the VPA application may be implemented in the audio output device and the user may provide voice commands to the VPA directly using one or more microphones configured in the audio output device for interpretation by the local VPA application. In an aspect, a voice command uttered by the user for the VPA can include a command for the audio output device to enter a low latency mode for the Bluetooth link. In an example implementation, the user command to enter the low latency mode may be detected and interpreted autonomously by the audio output device (e.g., using the local VPA), and the audio output device can initialize the low latency mode in response to the command. Examples of the VPA application can include Amazon Alexa assistant, Google Assistant, Microsoft Cortana assistant, or the like.

In certain aspects, audio AR applications benefit from using the low latency Bluetooth link. In the example implementation discussed above, the SDK, via the API, can further provide the software application access to a capability of the audio output device to detect certain body movements of the user. For example, the audio output device can include an Inertial Measurement Sensor (IMU) device capable of detecting a head orientation of the user. For example, the IMU device can include one or more sensors for detecting the user's body movements including head movements, the sensors including one or more accelerometers, one or more magnetometers, and/or one or more gyroscopes. The SDK, via the API, can provide the software application access to a data stream including data recorded by one or more of these sensors. In an aspect, a gaming application may include an audio AR module that is configured to provide an immersive gaming experience to the user by shifting the audio soundscape with the turning user's head. The gaming application, based on the sensor data from the headphones can generate low latency spatial AR audio to be streamed to the headphones over the Bluetooth link.

In another example application, the SDK can be used to place the audio output device into a spatial audio mode. In this mode, sensor data tracking the head position of the user wearing the audio output device can be sent to the SDK, where processing in the software application (e.g., audio AR application) that embeds the SDK can be used to add spatial effects to the audio. As part of this spatial audio mode, the app SDK can direct the audio output device into a low latency mode, ensuring that the latency in which sensor data is sent to the user device, spatial audio is rendered and then returned to the audio output device is low enough to be a responsive, immersive experience for the user. Spatial or spatialized audio, as used herein, relates to audio that delivers a fully (or nearly) 360 degree sound experience and responds to user movement, such as the direction that a user is looking (e.g., using at least an IMU to detect the direction) and/or the location of the user (e.g., using at least GPS technology to detect the location). Thus, spatialized audio as used herein is different from typical stereo, binaural, or surround sound audio, as audio output from electro-acoustic transducers for such typical audio types is static and does not change based on user movement, whereas spatialized audio is dynamic. As can be appreciated based on this disclosure, the low latency mode would benefit spatialized audio applications, as the updated render latency in response to user movement would be reduced based on at least using a reduced render buffer size at the audio output device. Therefore, the techniques described herein enable a more responsive, while still allowing high audio quality (e.g., having a sampling rate of at least 44.1 kilohertz and/or a linear bit depth of at least 16 bits per sample).

In certain aspects, additionally or separately, audio data communicated between the user device and the audio output device can be encoded using one or more codecs that are not natively supported by the user device to achieve a lower bit-rate than what is natively supported by the user device for high quality audio. For example, a low bit-rate audio codec that is not natively supported by the user device can be used to communicate audio data (e.g., high quality audio data) over the Bluetooth link. In an aspect, encoding the audio data using the low bit-rate codec facilitates reducing buffer size at the audio output device for implementing the low latency mode while maintaining acceptable RF robustness. For instance, by communicating more highly compressed (and therefore lower bit-rate) high quality audio (e.g., higher than codecs natively supported by the user device) between the user device and the audio output device, audio data can be sent more efficiently over the air and more airtime is available to retransmit dropped packets, thus allowing the audio output device to reduce its render buffer and thereby overall end to end latency of the Bluetooth link. In an aspect, high quality audio data encoded using the low bit-rate codec can be transmitted at rates as low as 50 kbps or less at a sampling rate of at least 44.1 kilohertz and/or a linear bit depth of at least 16 bits per sample. In an aspect, a low bit-rate codec that can work for this purpose is the Constrained Energy Lapped Transform (CELT) audio compression format. However, any suitable low bit-rate codecs can be used in other implementations. In an aspect, the low bit-rate coded can support bit-rates of at most 50 kbps, 40 kbps, 30 kbps, 20 kbps or 10 kbps.

In certain aspects, the low bit-rate codec can be used to transmit low latency high quality audio from the user device to the audio output device, while simultaneously transmitting limited bandwidth voice or high quality audio from the audio output device to the user device on a back channel. For instance, the low bit-rate codec can allow a high quality audio data using to stream from a smartphone to headphones, while simultaneously allowing transmission of voice data (e.g., relating to a voice call or voice chat) from the headphones to the smartphone on a back channel. In an example gaming application, this allows a user playing a game to chat with other users while streaming high quality gaming audio to the headphones. In certain aspects, the low bit-rate codec not natively supported by the user device can be used for streaming high quality audio data from the user device to the audio output device as well as for the voice back channel from the audio output device to the user device. In alternative aspect, the high quality audio data can be streamed from the user device to the audio output device using A2DP profile and associated codec natively supported by the user device, while the voice back channel can use the low bit-rate audio coded not natively supported by the user device.

Current smartphones and other user devices do not support transmission of HFP audio and A2DP audio at the same time. HFP audio is scheduled as part of a Synchronous Connection Oriented (SCO) channel, which defines fixed slots for audio to be transmitted. This takes up a lot of bandwidth but enables low latency audio transmission. However, due to the amount of airtime required by the low latency SCO channel, it is difficult for the phone to simultaneously transmit higher throughput A2DP audio in a timely manner.

In certain aspects, in order to implement simultaneous transmission of high quality audio data from a user device to an audio output device and voice data on a back channel, both the forward and back channel data can be encoded using the low bit-rate codec (instead of SBC coded generally used for HFP and A2DP). Using the low bit-rate codec allows transport of speech and high quality audio at lower bit rates. For example, high quality speech encoded by the low bit-rate codec can be transmitted at rates around 14 kbps and high quality audio can be transmitted at rates of 50 kbps or less. As noted above, by using more highly compressed (and therefore lower bit rate) high quality audio from the phone to the headphones, audio data can be sent more efficiently over the air and more airtime is available to retransmit dropped packets, allowing the headphone to reduce its incoming audio buffer and thereby reducing latency. Additionally, more airtime is available to send an audio back channel, either for limited bandwidth voice or high quality audio from the headphone to the phone. In an example implementation, a proprietary interface can be created between the audio output device and the SDK that is integrated into third party applications, allowing implementation of use cases that enable lower latency music and voice at the same time over the Bluetooth link.

In certain aspects, the low bit-rate codec can be used to transmit sensor data (e.g., IMU data) from the audio output device to the user device to be used in spatial audio applications, while simultaneously streaming high quality audio data (including spatial audio data based on the sensor data) from the user device.

It can be noted that, descriptions of aspects of the present disclosure are presented above for purposes of illustration, but aspects of the present disclosure are not intended to be limited to any of the disclosed aspects. Many modifications and variations will be apparent to those of ordinary skill in the art without departing from the scope and spirit of the described aspects.

In the preceding, reference is made to aspects presented in this disclosure. However, the scope of the present disclosure is not limited to specific described aspects. Aspects of the present disclosure can take the form of an entirely hardware embodiment, an entirely software embodiment (including firmware, resident software, micro-code, etc.) or an embodiment combining software and hardware aspects that can all generally be referred to herein as a "component," "circuit," "module" or "system." Furthermore, aspects of the present disclosure can take the form of a computer program product embodied in one or more computer readable medium(s) having computer readable program code embodied thereon.

Any combination of one or more computer readable medium(s) can be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium can be any tangible medium that can contain, or store a program.

The flowchart and block diagrams in the Figures illustrate the architecture, functionality and operation of possible implementations of systems, methods and computer program products according to various aspects. In this regard, each block in the flowchart or block diagrams can represent a module, segment or portion of code, which comprises one or more executable instructions for implementing the specified logical function(s). In some alternative implementations the functions noted in the block can occur out of the order noted in the figures.

For example, two blocks shown in succession can, in fact, be executed substantially concurrently, or the blocks can sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

What is claimed is:

1. A method for exchanging data between a user device and an audio output device over a wireless link, comprising:
    detecting that a trigger event for initializing a low latency mode has occurred at the user device, the low latency mode configured to cause the audio output device to reduce a size of a render buffer to be used for rendering audio data, wherein detecting the trigger event comprises:
        detecting that a power of signals received from the audio output device has exceeded a signal power threshold; and
        in response, determining that the user device is closer to the audio output device;
    transmitting, in response to the detecting that the power of signals received from the audio output device has exceeded the signal power threshold, an indication to the audio output device to initialize the low latency mode, the indication causing the audio output device to reduce the size of the render buffer to be used for rendering the audio data; and
    transmitting the audio data to the audio output device over the wireless link.

2. The method of claim 1, wherein the render buffer is reduced by at least half compared to an initial render buffer size.

3. The method of claim 1, wherein detecting the trigger event further comprises detecting that a software application that utilizes the low latency mode has been launched on the user device.

4. The method of claim 3, further comprising providing an Application Programming Interface (API) to the software application by using a Software Development Kit (SDK) embedded in the software application, the SDK providing the software application, via the API, access to at least one capability of the audio output device.

5. The method of claim 4, wherein the SDK performs at least the detecting the trigger event and the transmitting the indication.

6. The method of claim 1, wherein detecting the trigger event further comprises a determination that the audio data includes spatial audio to be rendered at the audio output device.

7. The method of claim 1, wherein detecting the trigger event further comprises receiving a voice command via a Virtual Personal Assistant (VPA) to enter the low latency mode.

8. The method of claim 1, wherein the wireless link uses a Bluetooth protocol.

9. The method of claim 8, wherein the Bluetooth protocol uses the Advanced Audio Distribution Profile (A2DP) to transmit the audio data to the audio output device.

10. The method of claim 1, wherein the audio data is encoded using one or more codecs that are not natively supported by the user device to achieve a lower bitrate than what is natively supported by the user device.

11. The method of claim 10, wherein the audio data has a sampling rate of at least 44.1 kilohertz and/or a linear bit depth of at least 16 bits per sample.

12. The method of claim 1, further comprising:
receiving data from the audio output device over the wireless link while simultaneously transmitting the audio data to the audio output device.

13. The method of claim 12, wherein the data received from the audio output device is voice data collected from at least one microphone of the audio output device.

14. The method of claim 12, wherein the data received from the audio output device is sensor data collected from at least one inertial measurement unit (IMU) of the audio output device.

15. A computer-readable medium for exchanging data between a user device and an audio output device over a wireless link, the computer-readable medium storing instructions which when processed by at least one processor performs a method comprising:
detecting that a trigger event for initializing a low latency mode has occurred at the user device, the low latency mode configured to cause the audio output device to reduce a size of a render buffer to be used for rendering audio data, wherein detecting the trigger event comprises:
detecting that a power of signals received from the audio output device has exceeded a signal power threshold; and
in response, determining that the user device is closer to the audio output device;
transmitting, in response to the detecting that the power of signals received from the audio output device has exceeded the signal power threshold, an indication to the audio output device to initialize the low latency mode, the indication causing the audio output device to reduce the size of the render buffer to be used for rendering the audio data; and
transmitting the audio data to the audio output device over the wireless link.

16. The computer-readable medium of claim 15, wherein the render buffer is reduced by at least half compared to an initial render buffer size.

17. The computer-readable medium of claim 15, wherein detecting the trigger event further comprises detecting that a software application that utilizes the low latency mode has been launched on the user device.

18. The computer-readable medium of claim 17, further comprising instructions for providing an Application Programming Interface (API) to the software application by using a Software Development Kit (SDK) embedded in the software application, the SDK providing the software application via the API access to at least one capability of the audio output device.

19. The computer-readable medium of claim 18, wherein the SDK performs at least the detecting the trigger event and the transmitting the indication.

20. The computer-readable medium of claim 15, wherein detecting the trigger event further comprises a determination that the audio data includes spatial audio to be rendered at the audio output device.

21. The computer-readable medium of claim 15, wherein the wireless link uses a Bluetooth protocol.

22. The computer-readable medium of claim 21, wherein the Bluetooth protocol uses the Advanced Audio Distribution Profile (A2DP) to transmit the audio data to the audio output device.

23. The computer-readable medium of claim 15, wherein the audio data is encoded using one or more codecs that are not natively supported by the user device to achieve a lower bitrate than what is natively supported by the user device.

24. The computer-readable medium of claim 15, further comprising instructions for receiving data from the audio output device over the wireless link while simultaneously transmitting the audio data to the audio output device.

* * * * *